United States Patent [19]

Sagae

[11] 4,367,476

[45] Jan. 4, 1983

[54] INK JET PRINTING APPARATUS

[75] Inventor: Syoji Sagae, Hitachiota, Japan

[73] Assignees: Hitachi, Ltd.; Hitachi Koki Co., Ltd., both of Tokyo, Japan

[21] Appl. No.: 242,186

[22] Filed: Mar. 10, 1981

[30] Foreign Application Priority Data

Mar. 10, 1980 [JP] Japan ................................ 55-29178

[51] Int. Cl.$^3$ ........................................ G01D 18/00

[52] U.S. Cl. .................................... 346/1.1; 346/75

[58] Field of Search ...................... 346/75, 1.1, 140 R

[56] References Cited

U.S. PATENT DOCUMENTS 4,016,571 4/1977 Yamada ................................ 346/75

*Primary Examiner*—G. Z. Rubinson

*Assistant Examiner*—W. J. Brady

*Attorney, Agent, or Firm*—Antonelli, Terry and Wands

[57] ABSTRACT

An ink jet printing apparatus in which, among two types of ink droplets of small and large sizes ejected from a nozzle, only the ink droplets of small size are electrically charged in accordance with an information signal, deflected and directed toward a recording medium to produce thereon a desired image. The state in which the ink droplets are produced is detected by detecting means disposed in the vicinity of a flight path of the ink droplets. On the basis of the output signal produced from the detecting means, intensity of excitation imparted to the nozzle is set at a level at which the ink droplets of small size are stably produced. Further, the intensity of excitation imparted to the nozzle is corrected on the basis of the output signal available from the detecting means through phase matching means for causing generation of the small size ink droplet to coincide with phase of the information signal.

6 Claims, 26 Drawing Figures

FIG. 10

| MEMORY ADDRESS | STORED CONTENTS |
| --- | --- |
| X X X 0 | 0 0 |
| X X X 1 | 0 0 |
| X X X 2 | 0 0 |
| X X X 3 | 0 0 |
| X X X 4 | 4 0 |
| X X X 5 | 5 0 |
| X X X 6 | 6 0 |
| X X X 7 | 7 0 |
| X X X 8 | 8 0 |
| X X X 9 | 9 0 |
| X X X A | A 0 |
| X X X B | B 0 |
| X X X C | C 0 |
| X X X D | 0 0 |
| X X X E | 0 0 |
| X X X F | 0 0 |

INK JET PRINTING APPARATUS

BACKGROUND OF THE INVENTION

1. Field of the Invention

The present invention relates to an ink jet printing or recording apparatus. In particular, the invention concerns the ink jet printing apparatus for producing records by using ink droplets of smaller particle size among those produced from ink ejection by a nozzle.

2. Description of the Prior Art

In the ink jet printing apparatus, pressurized ink is supplied to a nozzle which is vibrationally energized by an electro-strain element excited electrically from a power supply source of high frequency, whereby ink droplets are ejected through a nozzle orifice. The ink droplets thus ejected are then electrically charged or electrified in accordance with information signals to be recorded and subsequently caused to run through an electric field of a predetermined intensity. As a result, the ink droplets are deflected in dependence on the electric charge carried by them and impinge on a recording medium to produce thereon an intended record or records. The recording or printing apparatus of this type is known and referred to as the ink jet printing or recording apparatus of charge modulation type.

In the ink jet printing apparatus of the charge modulation type, it is possible to produce alternately the ink droplets of a large diameter and a small diameter by setting appropriately the conditions for generation of ink droplets such as pressure under which ink is supplied to the nozzle, intensity or magnitude of excitation imparted to the nozzle, frequency of the excitation and so forth.

There has been already proposed a recording system in which record is produced by utilizing the ink droplet of a smaller diameter (hereinafter referred to also as ink droplet of small size or simply as small size droplets) which is imparted with quantities of electric charge in dependence on the information signals supplied from an information signal source. For example, reference is to be made to U.S. Pat. No. 4,016,571 specification of Takahiro Yamada issued Apr. 5, 1977 and assigned to the same assignee as the present application.

Since the system recited above allows ink droplets of a very small diameter (about one-third of the diameter of large size ink droplet) to be produced from a relatively large nozzle orifice, not only the work for fabricating the nozzle orifice is much facilitated and the orifice thus scarcely suffers clogging, but also the recording with the ink particles of small size can be carried out with an enhanced reliability, whereby a high density recording of images, pictures, patterns and so forth can be accomplished with an improved quality, to advantage.

However, in order to actually assure the advantages described above, it is required that the small size ink droplets be produced stably and reliably from the nozzle and that the timing at which the small size ink droplet is separated (hereinafter referred to also as separation timing) has to coincide with phase of the information signal to be recorded.

In this connection, it has been observed that variations in the ambient temperature and humidity as well as operation or shut-down of the apparatus for a long period of time will bring about variations in the physical properties of ink contained in the nozzle and intensity of excitation applied to ink ejected from the nozzle, involving difficulties in producing the small size ink droplets stably and possibly in matching the separation timing of the small size ink droplet with the phase of the information signal.

In conjunction with the proposed system, it is also known to impart a predetermined quantity of electric charge to the small size droplets for detection thereof and establish the coincidence between the separation timing of the small size ink droplet and the information signal by utilizing the output signal from the charge detector. However, it is impossible to establish such coincidence automatically.

SUMMARY OF THE INVENTION

An object of the present invention is therefore to attain a recording with ink droplets of small size in a stable and reliable manner by making it possible to detect generation of the small size ink droplet and at the same time match the separation timing of the small size ink droplet with phase of an electrifying signal for charging electrically the small size ink droplet.

Another object of the invention is to produce the ink droplets of small size without fail by automatically setting a range of excitation applied to the nozzle in which the small size ink droplets can be produced stably and exciting the nozzle at a predetermined intensity within the range as set.

Still another object of the invention is to make it possible to automatically detect a specific intensity of excitation at which the separation timing of the small size ink droplet coincides with phase of an information signal to be recorded and vibrationally excite the nozzle at the detected intensity to assure the positive matching between the separation timing of the small size ink droplet and the phase of information signal.

In view of above objects, there is proposed according to a general aspect of the invention an ink jet printing apparatus in which ink droplets of smaller size among those ejected from a nozzle are electrically charged in accordance with an information signal and directed under deflection toward a recording medium for production of a desired image thereon. The ink jet printing apparatus comprises detecting means disposed in the vicinity of the path of ink droplets for detecting the state in which the ink droplets are produced, wherein the output signal from the detecting means is utilized for setting the excitation imparted to the nozzle at a predetermined intensity or magnitude at which the ink droplets of small size can be produced stably. Additionally, the intensity of excitation of the nozzle is corrected on the basis of the output signal from the detecting means through phase matching means so as to make the generation of the small size ink droplet coincide with the phase of an information signal.

BRIEF DESCRIPTION OF THE DRAWINGS

FIG. 10 illustrates relations between specific addresses of a memory contained in the control unit shown in FIG. 4 and signals corresponding to the output signals of the droplet detector obtained in accordance with the procedure illustrated in the flow chart shown in FIG. 7.

DETAILED DESCRIPTION OF THE PREFERRED EMBODIMENTS

Now, the invention will be described in detail with reference to the drawings which illustrate an exemplary embodiment of the invention.

Figure 1:
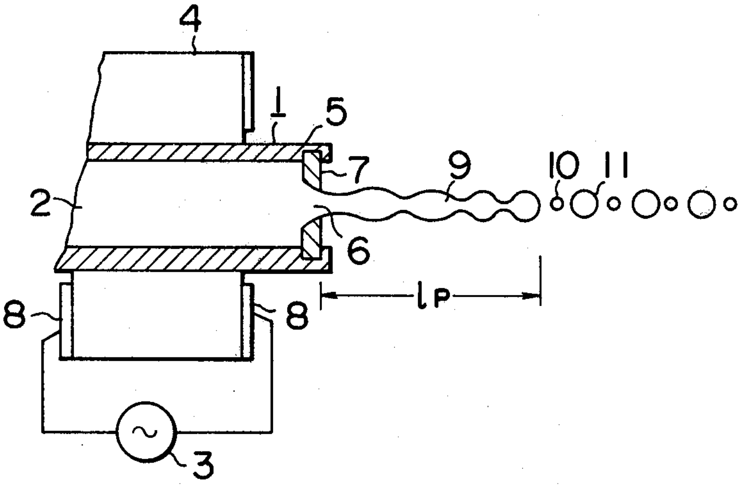
FIG. 1 is an enlarged sectional view of a nozzle assembly constituting a part of an ink jet printing apparatus to which the invention is applied.

Referring to FIG. 1 which is an enlarged sectional view showing a nozzle unit employed in carrying out the invention, a nozzle 1 is supplied with pressurized ink 2 from an ink tank or container (not shown). Disposed around the outer periphery of the nozzle 1 is an electrostrain element 4 such as a piezo-electric element which is adapted to be vibrationally excited by a high frequency power source 3 to thereby impart vibration to ink 2 contained within the nozzle 1.

The nozzle 1 is composed of a metallic tube 5 and an orifice plate 7 formed with a nozzle orifice 6 for ejecting ink 2. When a voltage of high frequency is applied to the piezo-electric element 4 through electrodes 8 provided at both ends thereof from the high frequency power source 3, ink 2 is ejected from the nozzle 1 through the nozzle orifice 6 in a form of an ink column or stream 9 which is subsequently broken up into ink droplets 10 of small particle size and ink droplets 11 of large particle size.

The diameter of the nozzle orifice 6 is determined in consideration of the size of dot with which a recording or printing as intended is to be performed, while the frequency of the voltage applied to the piezo-electric element 4 for the excitation thereof from the high frequency power source 3 is determined on the basis of the desired recording or printing speed. The orifice aperture as well as the excitation frequency once determined is held constant.

Figure 2:
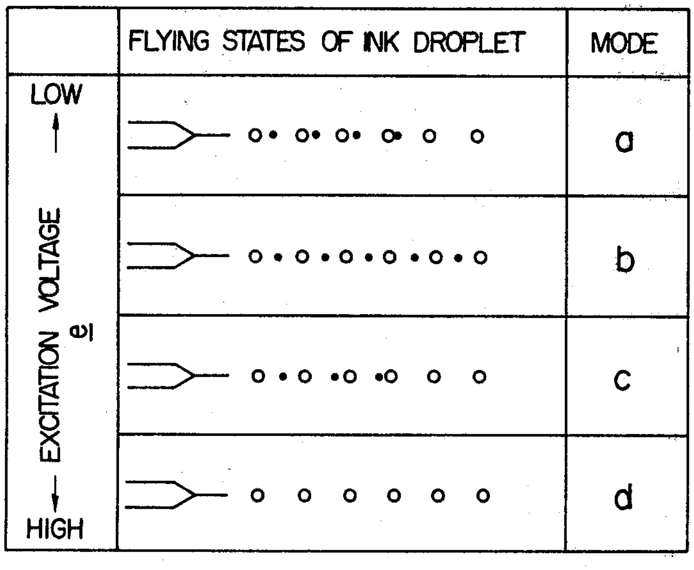
FIG. 2 illustrates relationships between excitation voltage applied to an electro-strain element of the nozzle assembly and flying states of ink droplets.
Figure 3:
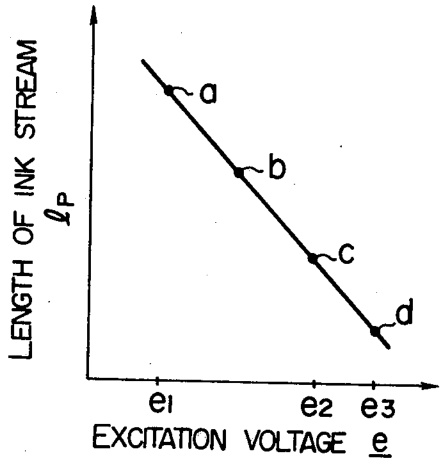
FIG. 3 graphically illustrates a characteristic relationship between the excitation voltage and length of an ink stream or column formed at an ejecting end of the nozzle.

When the amplitude of output voltage from the high frequency power source 3, i.e. the amplitude of the excitation voltage e is changed, then the mode in which the ink droplets are produced and length $l_p$ of the ink column or stream 9 are subjected to variations in the manners illustrated in FIGS. 2 and 3.

Here, description will be made on the relationship between the modes for generation of the ink droplets and the excitation voltage e by referring to FIG. 2.

When the excitation voltage is low, there prevails a mode a in which the flying speed of the droplets 10 of small particle size is lower than that of the ink droplets 11 of large size, resulting in that the large size droplet 11 catches up with the small size droplet 10 in the course of flying to be finally taken into the latter. This mode a is referred to as the low speed mode.

Next, when the amplitude of excitation voltage e is increased by a small degree, there prevails a mode b (refer to FIG. 2) in which the speeds of the ink droplets 10 and 11 of small and large particle sizes are substantially equal to each other so that they fly separately without being combined into one. This mode is referred to as the intermediate speed mode.

When the amplitude of excitation voltage e is further stepped up, the ink droplets are produced in a manner illustrated in FIG. 2 at a mode c. In this state, the ink droplets 10 of small size are imparted with a higher speed than the large size ink droplets 11. As the consequence, the ink droplets 10 of small size will ultimately catch up with the droplets 11 of large size to be integrally combined with the latter. This state is referred to as the high speed mode.

Further increasing of the amplitude of the excitation voltage e will lead to a mode d illustrated in FIG. 2 in which no ink droplets 10 of small size are produced at all with only the ink droplets 11 of large size being produced. This state or mode is referred to as the small droplet absence mode.

FIG. 3 graphically illustrates a relationship among the excitation voltage e, the length $l_p$ of the ink stream or column 9 and the ink droplets producing modes a, b, c and d. It can be seen from this figure that as the excitation voltage e is increased, the length $l_p$ of the ink stream or column 9 becomes shorter, while the ink droplet producing mode undergoes successive changes from the mode a to the mode d.

The phenomenon mentioned just above can be explained by the fact that increasing of the excitation voltage will bring about correspondingly increased magnitude of the excitation applied to ink ejected from the nozzle 1 and hence a correspondingly intensified initial vibration which occurs in the ink column or flow mass 9, resulting in that the rate at which the ink flow mass is periodically constricted is increased, whereby the time required for ink 2 to be ejected from the nozzle orifice 6 in the form of the ink column or stream 9 and separated discretely into the ink droplets is shortened.

On the other hand, separation of the small size droplet 10 from the ink stream or column 9 takes place in synchronism with the frequency of the excitation voltage e applied to the piezo-electric element 4 from the high frequency power source 3. Accordingly, a timing phase $\theta$ for separation of the ink droplets 10 can be varied as a function of the excitation voltage e and thus adjusted in a range of 0 to $2\pi$ of the excitation period.

Thus, it has been established that the ink droplets 10 of small size can be positively produced by regulating correspondingly the magnitude of vibrational excitation imparted to ink mass ejected from the nozzle 1 and that the recording with the ink droplets of small size can be assured stably with high reliability by making the timing of separation of the droplet from the ejected ink stream coincide precisely with phase of an information signal to be recorded.

Starting from the established fact described above, it is proposed according to the teaching of the present invention to detect that pairs of ink droplets of small and large particles sizes are produced with certainty, set the excitation voltage applied to the piezo-electric element so that magnitude or intensity of excitation of the nozzle is in a range in which the ink droplets of small size are produced, verify that the ink droplets of small particle size are actually ejected without fail, correct or readjust the intensity of excitation applied to the nozzle so that the phase of information signal coincides with generation or separation timing of the ink droplets of small particle size, and subsequently verify that the separation of the small size droplets in coincidence with the phase of information signal is satisfactory effected.

Figure 4:
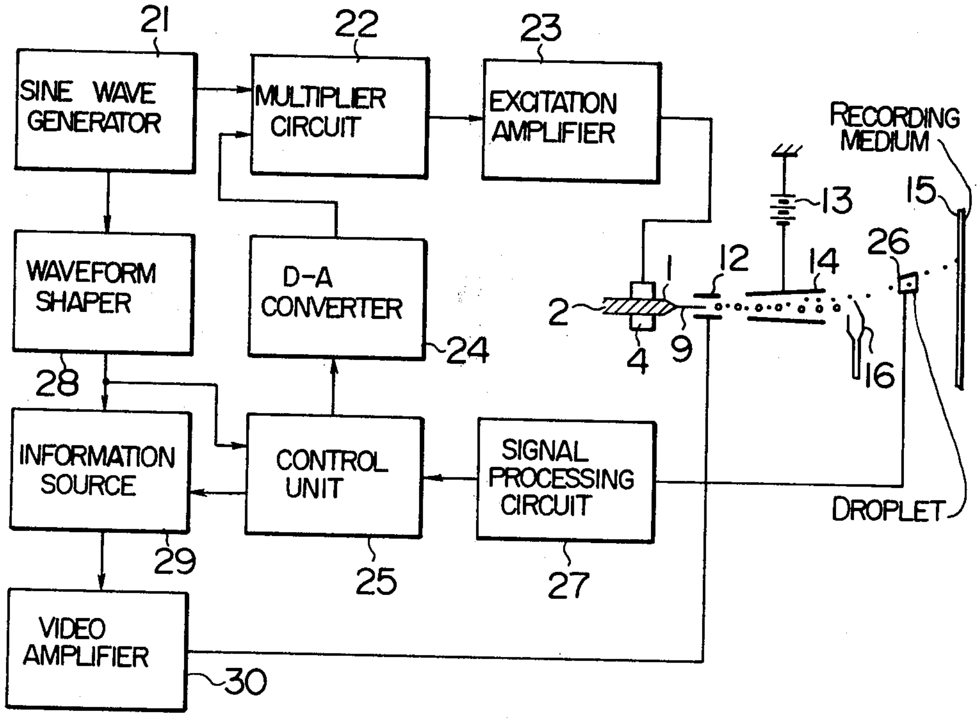
FIG. 4 shows in a block diagram an exemplary embodiment of the invention.

Referring to FIG. 4 which shows in a block diagram a main portion of an ink jet printing apparatus according to an embodiment of the invention, electrifying or charging electrodes 12 are disposed at a position where the ink droplets are separated from the ink column or stream 9 ejected from the projecting end of the nozzle 1. The ink droplets 10 and 11 are thus imparted with electric charge of magnitude proportional to that of the voltage applied to the electrifying electrodes 12.

The electrically charged ink droplets 10 and 11 are subsequently caused to pass through a space defined between deflecting plates 14 which are connected to a D.C. high voltage power source 13, whereby the ink droplets 10 and 11 are subjected to deflection in dependence on the quantity of electric charge imparted to them and then impinges on a recording medium 15.

In the meantime, those ink droplets which are useless for the recording or printing (i.e. those ink droplets which have not been electrified or imparted only with an insufficient quantity of charge, if electrified) are recovered by a catcher 16.

Next, a control circuit for controlling the excitation voltage supplied to the piezo-electric element 4 as well as a signal voltage applied to the electrifying or charging electrodes 12 will be described by referring also to FIG. 5.

Reference numeral 21 denotes a sine wave generator whose output is supplied to the piezo-electric element 4 through a multiplier circuit 22 and an excitation amplifier 23.

Figure 5:
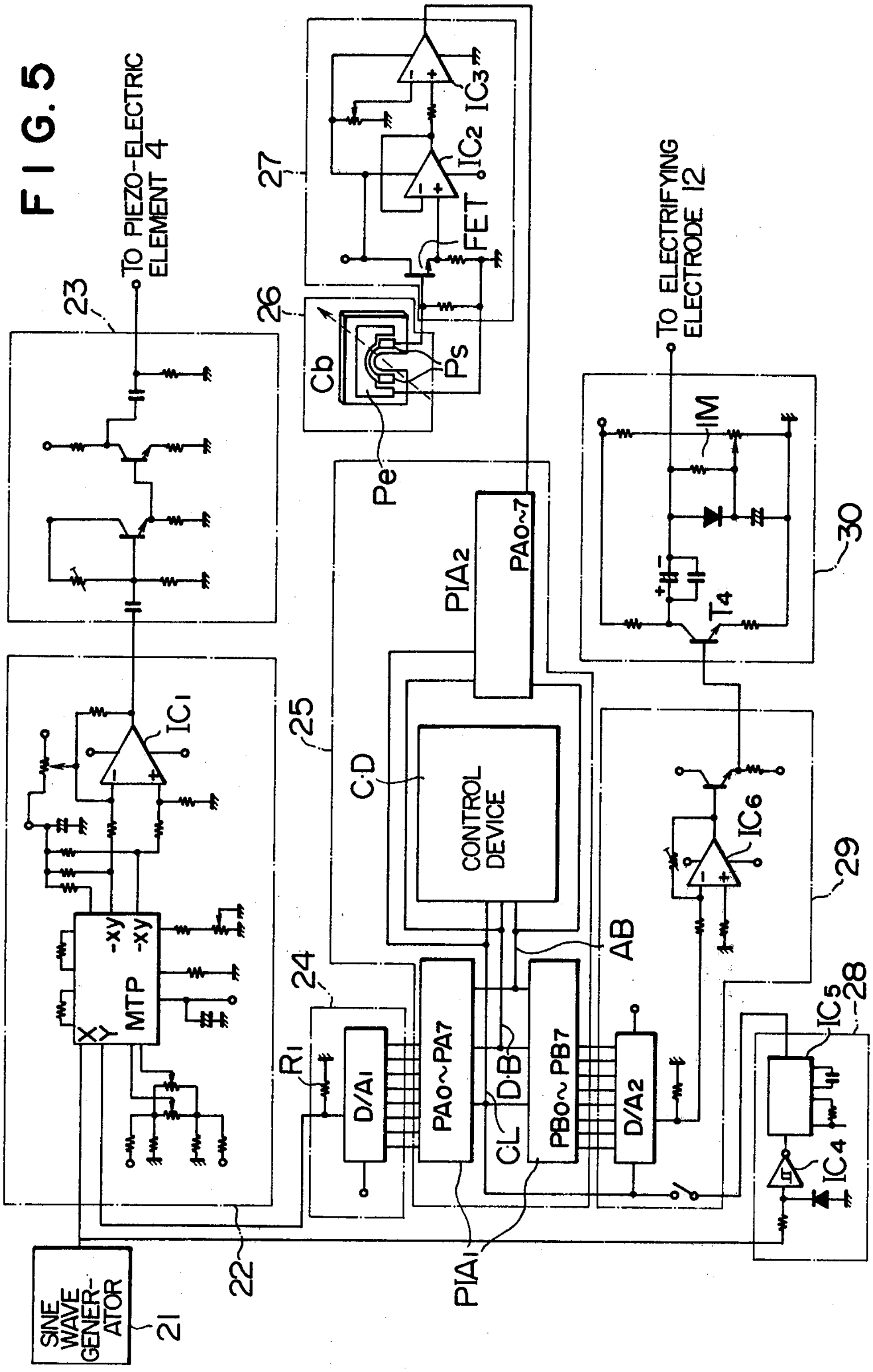
FIG. 5 is a circuit diagram showing details of a main portion of the circuit arrangement shown in FIG. 4.
Figure 6A:
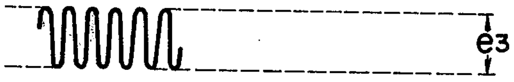
FIGS. 6a to 6d are signal waveform diagrams to illustrate relations among the excitation voltage, electrifying voltage signal and an output signal of a detector for detecting ink droplets.
Figure 6B:
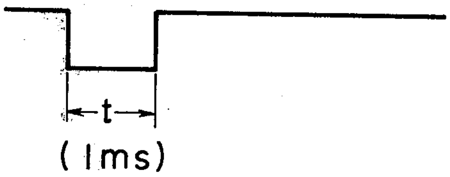
Figure 6C:
Figure 6D:

The multiplier circuit 22 is composed of a multiplier MTP and an operational amplifier IC 1 as shown in FIG. 5. The multiplier MTP has input terminals X and Y and output terminals +XY and −XY. The output signal from the sine wave generator 21 is applied to one input terminal X, while the outer input terminal Y is supplied with an output signal from a digital-to-analog converter (hereinafter referred to as D-A converter) 24.

The D-A converter 24 is of an 8-bit capacity. When a digital signal of eight bits (logic "0" and/or "1") is applied to the eight input terminals of the D-A converter 24, an analog output corresponding to the digital input signal is extracted as a voltage appearing across a resistor $R_1$. By way of example, the D-A converter 24 may be implemented such that when eight bits of the digital input signal are all logic "0", the analog output signal is then 0 volt, while for the digital input signal in which eight bits are all logic "1", the analog output voltage of 1 volt is derived.

In view of the fact that the value of the output signal from the multiplier circuit 22 can be varied in accordance with the value of the input signal, it can be said that the multiplier circuit 22 constitutes a programmable amplifier in combination with the D-A converter 24.

The input to the D-A converter 24 is controlled by a control unit 25 which comprises a control device (C.D) composed of a central processing unit (CPU), a read-only memory (ROM), a random access memory (RAM) and input/output interface elements and peripheral interface adapters (hereinafter also referred to as PIA in abridgement), as is shown in FIG. 5. This control device may be constituted by a current microcomputer.

The control device (C.D) and the peripheral interface adapters or PIA are connected to each other through a control line (C.L), an address bus (A.B) and a data bus (D.B). Since the PIA can arbitrarily be used as an input line or an output line in dependence on the states of the control line (C.D), a predetermined digital signal is extracted from the control device (C.D) by way of output lines ($PA_0$ to $PA_7$) for controlling the input to the D-A converter 24.

A detector 26 for detecting a quantity of electric charge carried by the ink droplet is composed of signal electrodes Ps and a guard electrode Pe which are implemented on a ceramic substrate Cb, as shown in FIG. 5 (reference is to be made also to FIG. 4). When the electrified (i.e. electrically charged) ink droplet passes through the detector 26 in a direction indicated by an arrow-headed broken line, a signal voltage is induced in the signal electrode Ps under the influence of electric charge carried by the flying ink droplet. This signal voltage is taken out as a detection signal.

The output signal from the detector 26 is supplied as an input signal to a transistor (FET) of a signal processing circuit 27 and undergoes amplification and level comparison in an operational amplifier $IC_2$ and a converter $IC_3$ of the signal processing circuit 25 to be converted into an output signal of a predetermined magnitude.

The output signal from the signal processing circuit 27 is supplied to the input lines ($PA_0$ to $PA_7$) of $PIA_2$, whereby presence or absence of the detection signal is determined.

The output signal from the sine wave generator 21 is applied to the input of a waveform shaping circuit 28 which is composed of a Schmitt circuit $IC_4$ and a multivibrator $IC_5$, whereby the high frequency voltage of a sinusoidal waveform is converted into a digital "ON-OFF" signal which is then supplied to an information signal source 29.

The information signal source 29 is composed of a D-A converter $D/A_2$ and an operational amplifier $IC_6$. The output signal of the control unit 25 appearing on the output lines $PB_0$ to $PB_7$ of the $PIA_1$ is applied to the D-A converter $D/A_2$ together with the output signal from the waveform shaping circuit 28, the latter being applied selectively, whereby a predetermined information signal is derived as the output signal from the information signal source 29.

The output signal from the information signal source 29 is amplified to a voltage of a predetermined magnitude through a video amplifier 30 and then applied to the charging or electrifying electrodes 12.

In the foregoing, an arrangement for carrying out the invention has been described. Now, a process for detecting generation of the ink droplets will be elucidated by referring to FIGS. *6a* to *6d*.

FIG. *6a* illustrates the output signal of the excitation amplifier 23 which has an amplitude set to the excitation voltage $e_3$ illustrated in FIG. 3. Consequently, all of the ink droplets ejected from the nozzle 1 are of large particle size, i.e. only ink droplets 11.

Under the conditions, when an electrifying signal $E_1$ of negative polarity for detection of the ink droplet such as shown in FIG. *6b* is applied across the charging electrode 12, thereby electrifying the ink droplets of large size, the latter is charged with a positive polarity.

In this connection, it should be noted that the pulse width t of the electrifying signal $E_1$ is selected so that $t=128T=1$ ms, where T represents a period of the excitation voltage $e_3$.

The large size droplet 11 thus charged undergoes deflection by the deflecting plates 14 and passes by in the vicinity of the detector 26, as the result of which a detection signal illustrated in FIG. *6c* is derived from the output of the detector 26.

The output signal from the detector 26 is delayed by a time $T_l$ relative to the electrifying or charging signal $E_1$. When the distance between the nozzle 1 and the detector 26 is selected equal to 40 mm on condition that the flying speed of the large size ink droplet 11 is 40 m/s, the delay time $T_l$ mentioned above is equal to 1 ms.

The output signal from the detector 26 is shaped to a waveform illustrated in FIG. *6d* through the waveform shaping circuit 27 and thereafter supplied to the input of $PIA_2$ of the control unit 25.

By the way, if a clogging should occur in the nozzle 1 at that time, resulting in no generation of the ink droplets 11 of large size, then no detection output signal is produced from the detector 26 and no input signal is given to the control unit 25. Under the conditions, the control unit 25 detects anomaly and signals an abnormal state by way of an alarm system (not shown).

With the aid of the detection signal produced from the detector 26, it is verified that the ink droplets 11 of large size are produced by the nozzle 1 in synchronism with the period T of the excitation voltage $e_3$. Then, the process may proceed to a next step.

Figure 7:
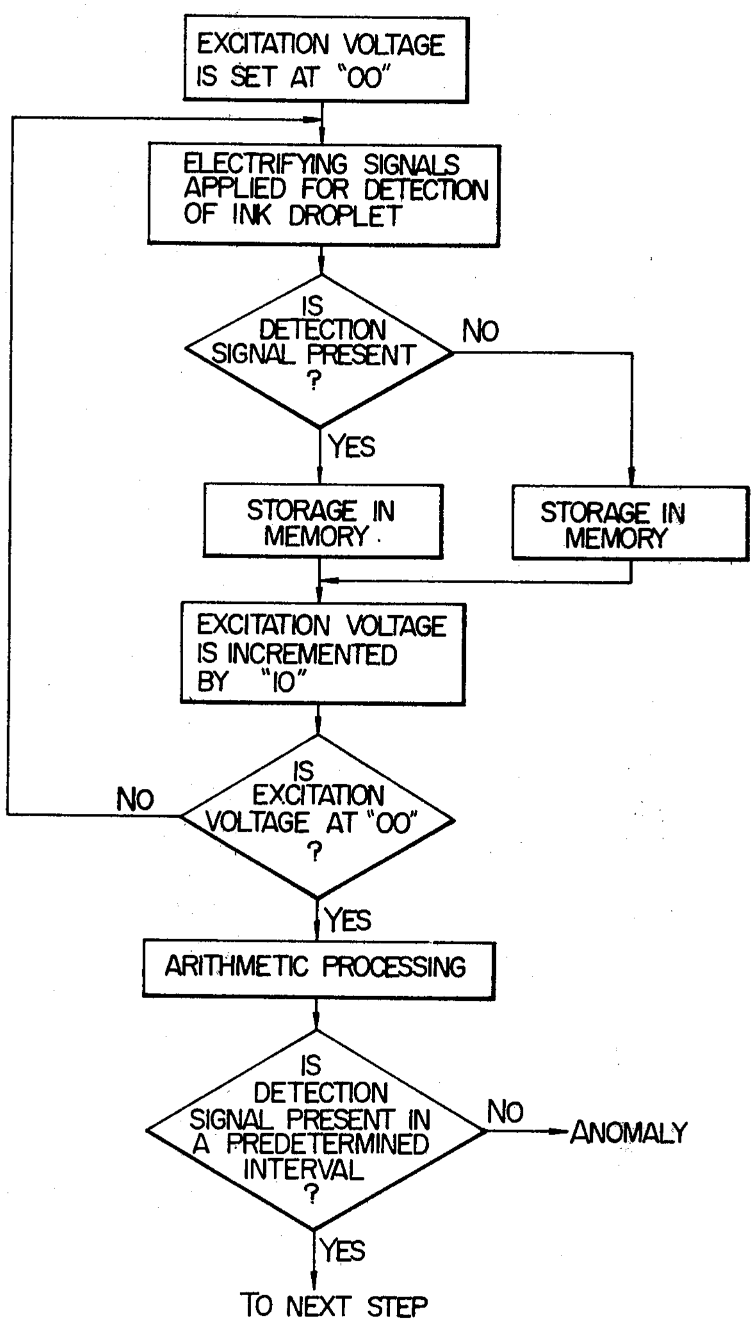
FIG. 7 is a flow chart to illustrate operations of a control unit for setting a predetermined excitation voltage for producing small size ink droplets from the nozzle by varying the excitation voltage stepwise over a number of stpes.
Figure 8A:
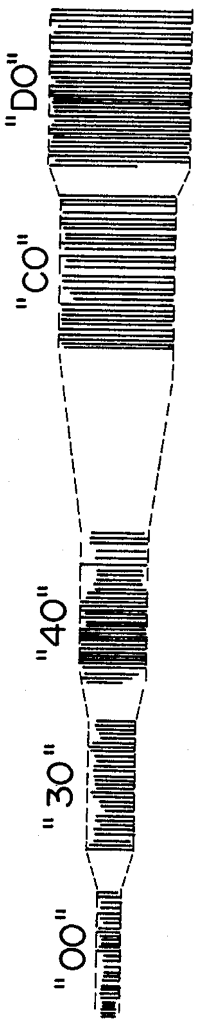
FIGS. 8a to 8b are signal waveform diagrams for illustrating the electrifying voltage signal and the output signal produced from the detector as obtained when the excitation voltage is varied in accordance with the procedure illustrated in the flow chart shown in FIG. 7.
Figure 8B:
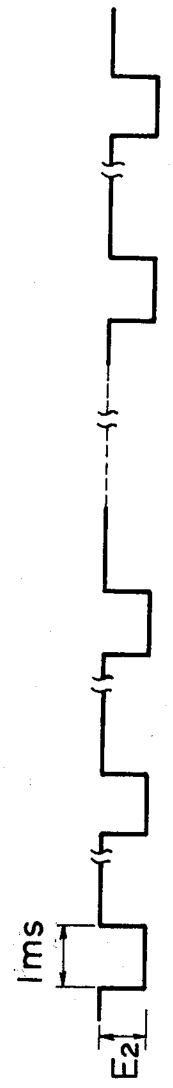
Figure 8C:
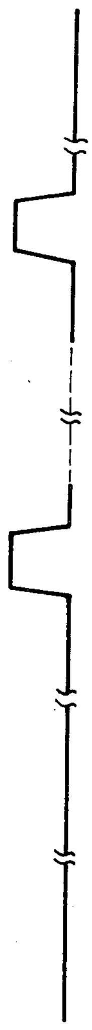

FIG. 7 shows a flow chart to illustrate a routine for detecting a range in which the ink droplets 10 of small size are generated by varying the magnitude of the excitation voltage e applied to the piezo-electric element 4. To this end, digital signals "00" to "FO" (in hexadecimal notation which will be adopted hereinafter) are successively produced from the control unit 25 on a step-by-step base and after having been converted into analog signals through the D-A converter 24, supplied through the multiplier circuit 22 to the excitation amplifier 23 the output signal from which is thus the varying excitation voltage e.

The range in which the excitation voltage e is varied is so set as to cover all the modes a to d illustrated in FIG. 3. In the case of the embodiment shown in FIG. 5, arrangement is made such that the excitation voltage e can be varied at sixteen steps by incrementing the value of the digital signal supplied to the D-A converter 24 from "00" to "FO" stepwise by "10".

On conditions that the diameter of the nozzle orifice 6 is 60μ, the excitation frequency is 128 KHz and that the pressure of pressurized ink is 10 Kg/cm², the excitation voltage e is varied stepwise in sixteen increments or steps in a range of 5 to 40 $V_{p\text{-}p}$.

Referring to the flow chart shown in FIG. 7, the excitation voltage e is first set to "00" as shown in FIG. *8a*, while the electrifying or charging signal $E_2$ for detection of the ink droplet which signal $E_2$ has a pulse width $t=1$ ms as illustrated in FIG. *8b* is applied across the electrifying electrodes 12 to thereby electrically charge the ink droplets.

It will be noted that only the charged droplet 10 of small size may be detected by the detector 26 at this stage. Further, ratio of deflection of the small size droplet 10 to that of the large size droplet 11 for a same magnitude of the electrifying signal $E_2$ is about 9 to 1. Under the conditions, the electrifying signal $E_2$ is so selected that $E_2<E_1$.

The small size ink droplets 10 electrically charged in response to the electrifying signal $E_2$ are caused to fly in the vicinity of the detector 26. On the other hand, the ink droplets of large size scarcely undergo deflection and are recovered by a catcher 16.

In this way, it is possible to detect the presence or absence of the ink droplet 10 of small size by means of the detector 26 whose output signal is then stored in a memory of the control unit 25.

FIG. *8c* shows the output signal from the detector 26 described above, and FIG. 9 graphically illustrates a relationship between the excitation voltage e (expressed in the hexadecimal notation) and the output signal of the detector 26. It has been found that the ink droplet 10 of small size can not be detected by the detector 26 when the excitation voltage e is in the range of "00" to "30" and when it goes beyond the level "DO".

Accordingly, it is important to set the excitation voltage in a range of "40" to "CO" shown in FIG. *9a* in order to assure that the ink droplet 10 of small size is produced with certainty and that the small size ink droplet 10 is prevented from being combined with the large size ink droplet 11 as long as possible under appropriate excitation of the nozzle 1.

The foregoing description concerns the case where the excitation voltage e applied to the piezo-electric element 4 of the nozzle 1 is set appropriately. When the excitation voltage e is set improperly, there may occur such situations where the detection signal output from the detector 26 behaves in such manners as illustrated in FIGS. *9b* to *9d*.

More particularly, in the case illustrated in FIG. *9b*, the ink droplet 10 of small size can not be detected by the detector even when the excitation voltage e is varied over sixteen steps "00" to "FO". This is the case where the intensity of exciation is either too feeble or too powerful.

In the case illustrated in FIG. *9c*, the ink droplet 10 of small size is still present and detected by the detector 26 even when the excitation voltage e is set to "FO". This is the case where the intensity of excitation is feeble.

In contrast, in the case illustrated in FIG. *9d*, the small size ink droplet 10 is still detected even at the step or level "00" of the excitation voltage e. This is because the intensity of excitation is too intensive.

Figure 9A:
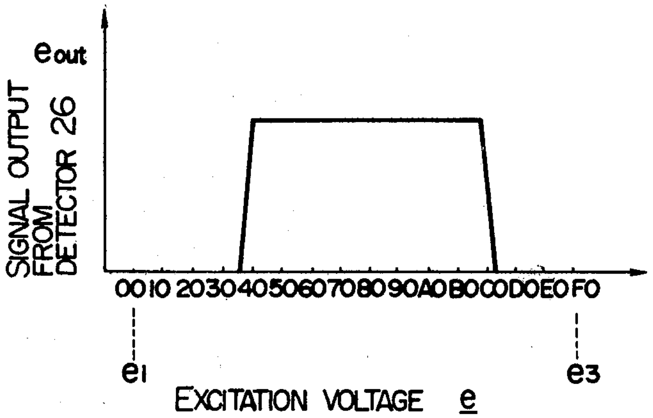
FIGS. 9a to 9d illustrate characteristic relations between the excitation voltage and the output signal from the droplet detector as obtained by varying the excitation voltage in accordance with the procedure illustrated in the flow chart shown in FIG. 7.
Figure 9B:
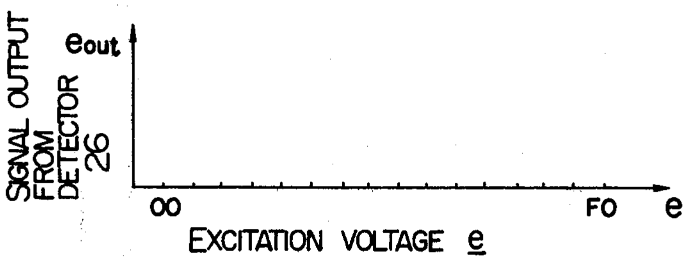
Figure 9C:
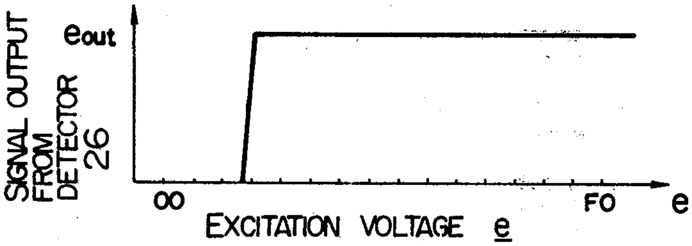
Figure 9D:
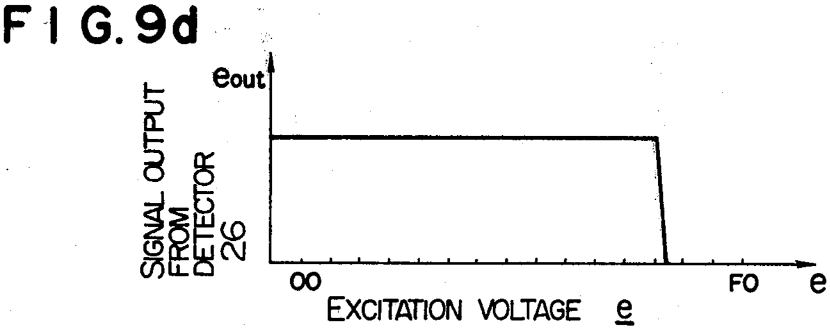

In order to exclude undesirable situations such as illustrated in FIGS. 9*b* to 9*d*, it is indispensible to establish the relationship between the excitation voltage e and the output signal from the detector 26 which is illustrated in FIG. 9*a* by adjusting properly the gains of the excitation amplifier 23 and the multiplier circuit 22 so that appropriate output signal is produced from the excitation amplifier 23.

FIG. 10 illustrated relationships between storage addresses and contents stored thereat in a memory of the control unit 25 for storing the output signals from the detector 26. As the detection signal such as illustrated in FIG. 9*a* is produced from the detector 26, this signal is sequentially stored in the memory at the respective addresses "XXXO" to "XXXF" in terms of the same digital quantities as the excitation voltages e. Of course, when no detection signal is present, "00" is stored at the associated addresses.

As can be seen from FIG. 9*a*, the excitation voltage e set at an intermediated value in the range of "40" to "CO" assures the most stabilized operation. Accordingly, after one cycle ("00" to "FO") of scanning operation has been completed, the intermediate value for the optimal excitation voltage is determined through arithmetic processing executed on the basis of the results of the scanning operation.

For example, in the case of the illustration in FIG. 10, the optimal excitation voltage may be determined as follows:

$$\frac{\text{"CO"} - \text{"40"}}{2} + \text{"40"} = \text{"80"}$$

Once the range of excitation voltage for producing the small size ink droplet 10 as illustrated in 9*a* as well as the optimal excitation voltage has been established, it is vertified that the ink droplets of small size are actually produced.

In the following, description will be made on the phase matching operation for controlling the relation between the information signal and the small size droplets 10 which are to be electrified in accordance with the information signal will be described by referring to FIGS. 11 to 13.

Figure 11:
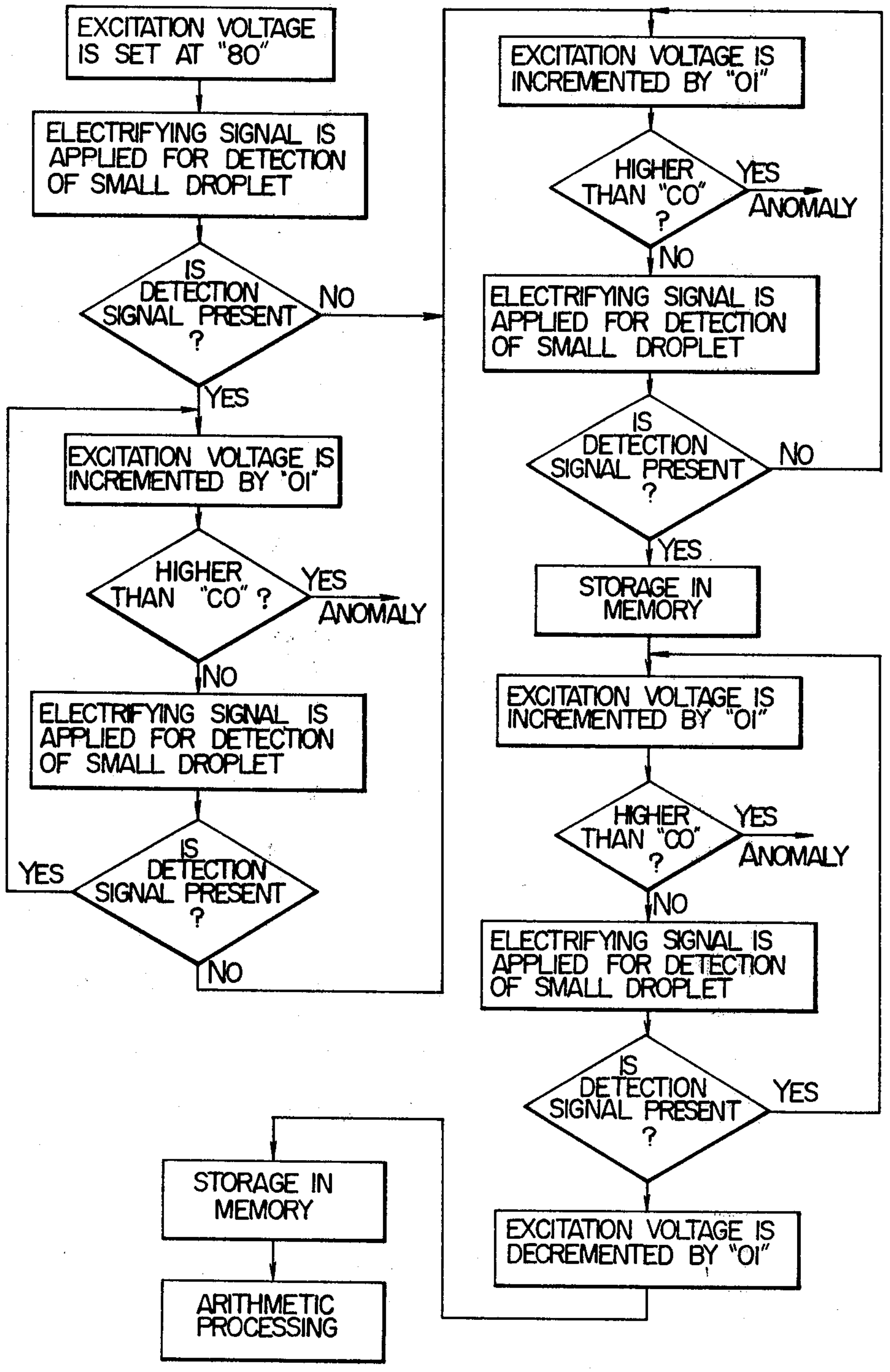
FIG. 11 shows a flow chart to illustrate operations of the control unit for making separation timing of the small size ink droplet coincide with phase of the electrifying voltage signal by varying the excitation voltage stepwise over a number of steps.

FIG. 11 shows a flow chart for illustrating operations for determining the range of excitation voltage which allows the small size ink droplet 10 to be appropriately electrified by matching the separating timing of the small size ink droplet 10 with the phase of the electrifying signal. In the first place, the excitation voltage e is set at the optimal value "80" mentioned above (refer to FIG. 12 at a) to thereby energize the piezo-electric element 4.

Next, an electrifying voltage signal $E_3$ is applied to the charging or electrifying electrodes 12 to thereby electrically charge the small size ink droplets 10. The charge carried by the small size droplet 10 thus electrified is then detected by the detector 26. In this connection, it should be mentioned that the pulse width $\alpha$ of the electrifying voltage signal $E_3$ for electrically charging the small size droplet 10 should not be longer than the excitation period T described hereinbefore. Otherwise, the ink droplet 11 of large size will also be electrically charged by the electrifying voltage signal $E_3$ due to the fact that the ink droplets of small and large sizes (10 and 11) are produced in a pair during the excitation period T as described hereinbefore, involving undersirable results.

In the light of the above consideration, the pulse width $\alpha$ of the electrifying voltage signal $E_3$ is so selected that $T/8<\alpha<T/2$. In the case of the embodiment being illustrated, the pulse width $\alpha$ is set equal to T/2.

It should further be mentioned that 128 pulses are produced by the control unit 25 for electrically charging the 128 ink droplets of small size by the electrifying voltage signal $E_3$.

Figure 12:
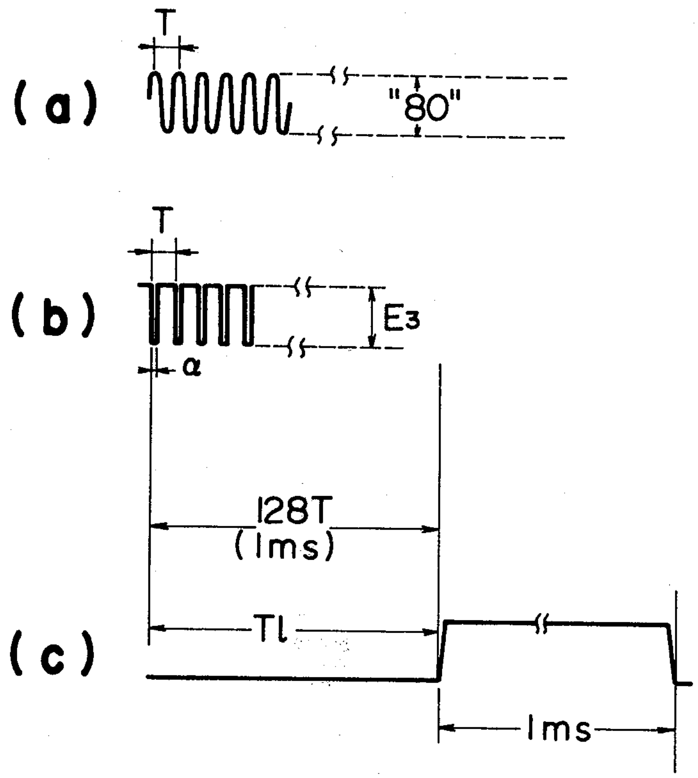
FIG. 12 shows in signal waveform diagrams relations among the excitation voltage, the electrifying signal and the output signal in the operations performed in accordance with the flow chart shown in FIG. 11.

When the timing at which the small size ink droplets 10 are separated from the ink stream or column 9 (i.e. separation timing) coincides with the phase of the electrifying voltage signal $E_3$, the electric charge carried by the small size droplet 10 is detected by the detector 26 with a delay time $T_l$, as is illustrated in FIG. 12 at (c).

The presence or absence of the detection signal output from the detector 26 is determined by the control unit 25. In case where the detection signal is present, the excitation voltage is successively increased stepwise by "01", while it is checked whether or not the excitation voltage goes beyond "CO". In the affirmative case, decision of anomaly is made. To the contrary, when the excitation voltage does not exceed "CO", the electrifying voltage signal $E_3$ is applied and the presence or absence of the output signal from the dectector 26 is examined.

FIGS. 13*a* to 13*f* graphically illustrate relationships between the output signal from the detector 26 and the excitation voltage e. The relation illustrated in FIG. 13*a* applies to the case in which the excitation voltage e is at "80" and the separation timing of the small size droplet 10 coincides with the phase of the electrifying voltage signal $E_3$. When the excitation voltage e is increased, the rate (timing) at which the separation of the small size droplet 10 takes place is correspondingly increased until the output signal from the detector 26 has disappeared due to mismatching between the separation timing of the small size droplet 10 and the phase of the electrifying voltage signal, which mismatching occurs in the range of excitation voltage from "82" to "89".

Further increasing of the excitation voltage e up to the range of "8A" to "94" results in that the detection signal is again produced. This increase in the excitation voltage e has been found to correspond to about 1 V to 2 V.

The range of the excitation voltage e of "8A" to "94" is stored in the memory provided in the control unit 25 for the purpose of correcting the excitation voltage e. The corrected value can be determined as follows:

$$\frac{\text{"94"} - \text{"84"}}{2} + \text{"80}A\text{"} = \text{"8}F\text{"}$$

In this manner, the optimal value for the excitation voltage e which assures reliably the timing-phase matching described above can be obtained by correcting the excitation voltage set at "80" to "8F".

Figure 13A:
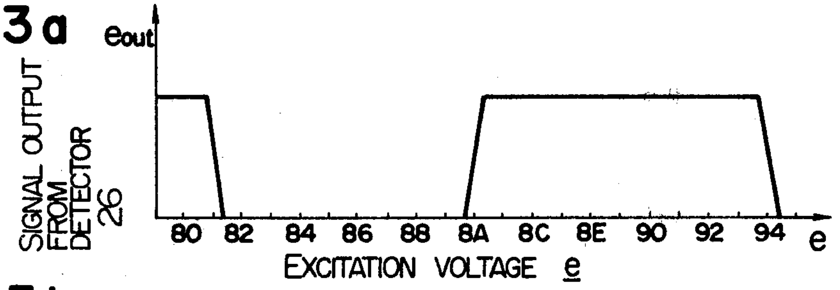
FIGS. 13a to 13f graphically illustrate characteristic relations between the excitation voltage and the output signal from the detector as obtained by varying the excitation voltage in accordance with the procedure illustrated in the flow chart shown in FIG. 11.
Figure 13B:
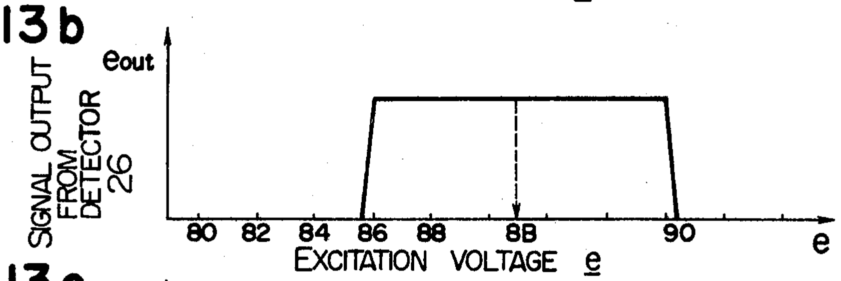

FIG. 13*b* illustrates a case where the separation timing of the small size droplet 10 does not coincide with the phase of electrifying voltage signal at the excitation voltage set at "80". Accordingly, the excitation volatage e is increased, whereby the output signal is produced from the detector 26 at the excitation voltage in the range of "86" to "90". On the basis of this range of the excitation voltage, the optimal value is arithmetically determined by the control unit 25 as follows:

$$\frac{\text{"90"} - \text{"86"}}{2} + \text{"86"} = \text{"8B"}.$$

It will now be appreciated that the range of the excitation voltage in which the separation timing of the small size ink droplet 10 coincides with the phase of the electrifying voltage signal $E_3$ is determined and subsequently the excitation voltage e is set at a mid-point of the range thus determined, whereby the desired timing-phase matching can be automatically accomplished.

The relations illustrated in FIG. 13*a* and 13*b* are based on the assumption that normal operation takes place. However, there may happen abnormal situations such as those illustrated in FIG. 13*c* to 13*f*.

Figure 13C:
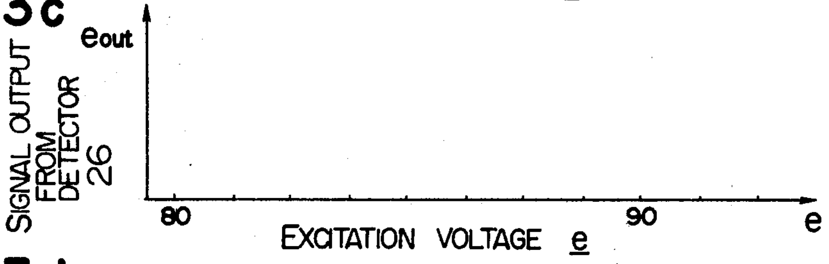

FIG. 13*c* illustrates the case where no output signal is produced from the detector 26 at any increased excitation voltage e. In this case, when the excitation voltage exceeds "CO", it is decided that the ink droplet of small size is no more produced even if the excitation voltage is further increased, whereby an alarm signalling anomaly is triggered, as is illustrated in the flow chart shown in FIG. 11.

Figure 13D:
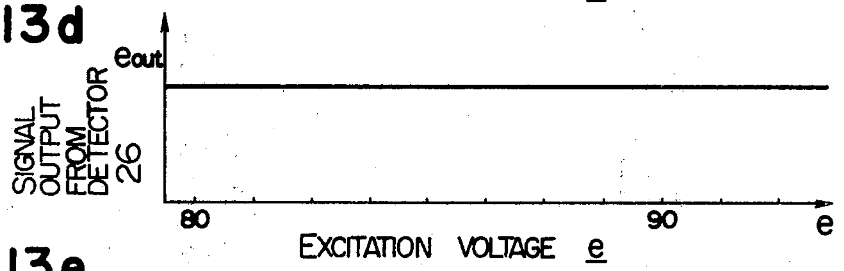

In the situation illustrated in FIG. 13*d*, the detection signal output from the detector 26 will not disappear notwithstanding any increasing of the excitation voltage e.

Figure 13E:
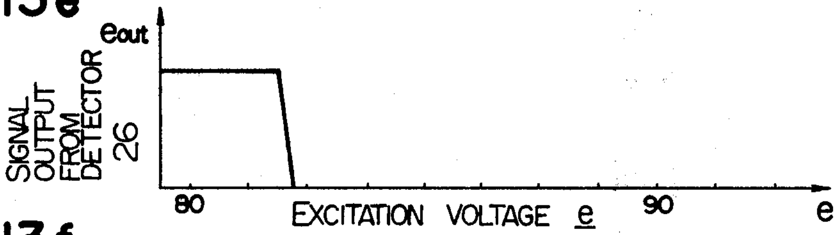
Figure 13F:
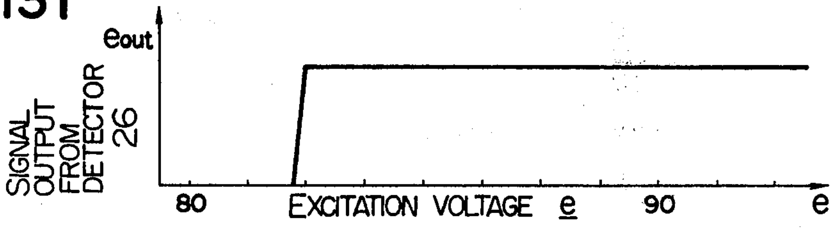

FIG. 13*e* illustrates the case where the detection signal output from the detector 26 is present in the initial state, but no output from the detector 26 can be detected when the excitation voltage is increased beyond a certain level. On the other hand, FIG. 13*f* illustrates the case where no detection signal is obtained at the initial excitation voltage, while the detection signal output from the detector 26 continues to be produced when the excitation voltage e is increased beyond a certain level. Under these circumstances, it is decided by the control unit 25 whether or not the states illustrated in FIGS. 13*c* to 13*f* continue to exist when the increased excitation voltage e exceeds the level "CO". If affirmative, then an alarm signal is generated. Finally, the corrected optimal excitation voltage is set. Then, it is confirmed with the aid of the output signal from the detector 26 whether or not the ink droplet 10 of small size is electrically charged in response to the electrifying voltage signal $E_3$ without fail. In the affirmative case, the electrifying voltage signal $E_3$ is replaced by the information signal, thereby to allow the recording or printing to be carried out with the ink droplets of small size.

As will be appreciated from the foregoing description, the teaching of the invention resides in that the range of excitation voltage in which the ink droplets of small size can be produced stably from the nozzle is automatically established by utilizing the output signal from the detector for detecting the generation of the ink droplets and that in order to cause the separation timing of the small size ink droplet to coincide with phase of the information signal, the intensity of excitation imparted to the nozzle is corrected on the basis of the output signal from the detector, to thereby generate the ink droplets of small size stably and positively and allow these droplets to be electrified in accordance with information signal with an enhanced reliability.

I claim:

1. An ink jet printing apparatus comprising:

ink jet nozzle means provided with high frequency excitation means and adapted to eject ink droplets of generally small and large sizes depending on the magnitude of high frequency excitation by said excitation means;

electrifying means for producing an electrifying signal which is capable of selectively charging said ejected ink droplets with electric charges;

deflecting means for deflecting the ink droplets depending on the amount of the electric charges thereof;

detecting means provided at an area where said deflected ink droplets should pass when suitably charged with electric charges and providing an output indicative thereof;

means for determining a value of the magnitude of excitation by said excitation means according to the outputs of said detecting means which are obtained when said electrifying means produces an electrifying signal having a first pulse-like waveform with an intensity so as to cause only those ink droplets of the small size to pass said area and with a first pulse-width larger than the period of said high frequency excitation, and when said excitation means progressively varies the magnitude of said excitation within a predetermined range, and correcting means for correcting the value of the magnitude of said excitation determined by said determining means according to the outputs of said detecting means which are obtained when said electrifying means produces an electrifying signal having a second pulse-like waveform with an intensity adapted to cause at least the ink droplets of small size to deflect and pass said area and with a second pulse-width smaller than the period of said high frequency excitations, and when said exciting means progressively varies the magnitude of the said excitation to deviate away from the value determined by said determining means.

2. An ink jet printing apparatus according to claim 1, wherein said determining means determines the value of the magnitude of said excitation when said exciting means varies the magnitude of said excitation stepwise and and electrifying means produces said electrifying signal with said first pulse width being sufficient to cover a plurality of periods of said high frequency excitation.

3. An ink jet printing apparatus according to claim 2, wherein said determining means determines the value of the magnitude of said excitation to be a first value within a range in the stepwise variation of the magnitude of said excitation where the output of said detecting means appears continuously.

4. An ink jet printing apparatus according to claim 3, wherein said correcting means corrects the first value of the magnitude of said excitation when said excitation means stepwise varies the magnitude of said excitation away from the first value determined by said determining means, said correcting means correcting the magnitude of said excitation to a second value within a range in the variation of the magnitude of said excitation where said detecting means again produces an output after said detecting means once fails to produce an output during the stepwise variation of the magntitue of said excitation.

5. An ink jet printing apparatus according to claim 2 or 3 or 4 wherein said first pulse width is n times the period T of the high frequency excitation, where n is an integer, and said second pulse width is within a range of (T/8) to (T/2).

6. In an ink jet printing apparatus comprising ink jet nozzle means provided with high frequency excitation means and adapted to eject ink droplets of generally small or large size depending on the magnitude of excitation of high frequency by said excitation means; electrifying means for producing an electrifying signal which is capable of selectively charging said ejected ink droplets with electric charges; deflecting means for deflecting the ink droplets depending on the amount of the electric charges thereof; detecting means provided at an area where said deflected ink droplets should pass when suitable charged with electric charges and providing an output indicative thereof, a method of determining an optimum value of the magnitude of excitation of said excitation means comprising the steps of:

setting the electrifying signal to have a first pulse-like waveform with an intensity so as to cause only those ink droplets of the small size to pass said area and with a first pulse-width larger than the period of said high frequency excitation, operating the apparatus to eject the ink droplets, while varying progressively the magnitude of said excitation within a predetermined range, determining a first value of the magnitude of said excitation within a range in the variation of the magnitude of said excitation where the output of said detecting means appears continuously;

resetting the electifying signal to have a second pulse-like waveform with an intensity adapted to cause at least the ink droplets of small size to deflect and pass said area and with a second pulse-width smaller than the period of said high frequency excitations, progressively varying the magnitude of said excitation from said first value, and determining a second optimum value of the magnitude of said excitation within a range in the variation of the magnitude of said excitation where the output of said detecting means again appears after once disappearing during the progressive variation of the magnitude of said excitation.

* * * * *